United States Patent [19]

Renshaw

[11] Patent Number: 5,081,464

[45] Date of Patent: Jan. 14, 1992

[54] METHOD AND APPARATUS FOR PRODUCING MULTIPLE, FREQUENCY-ADDRESSABLE SCANNING BEAMS

[75] Inventor: Kenneth H. Renshaw, Manhattan Beach, Calif.

[73] Assignee: Hughes Aircraft Company, Los Angeles, Calif.

[21] Appl. No.: 551,824

[22] Filed: Jul. 12, 1990

[51] Int. Cl.$^5$ .............................................. H01Q 3/22
[52] U.S. Cl. .................................................... 342/375
[58] Field of Search ................................. 342/375, 354

[56] References Cited

U.S. PATENT DOCUMENTS 3,766,558 10/1973 Kuechken .
4,882,588 11/1989 Renshaw et al. ................... 342/373

Primary Examiner—Theodore M. Blum

Attorney, Agent, or Firm—Steven M. Mitchell; Robert A. Westerlund; Wanda K. Denson-Low

[57] ABSTRACT

A method and apparatus are provided for producing multiple, frequency-addressable beams (66-80) employed in a satellite communication system. The beams (66-80) are effectively scanned over an area of the earth in order to communicatively interconnect small communication terminals on the earth. Multiple beams are formed which can be scanned independently of each other in the direction of scanning. Two or more beam formers (104, 106) are coupled in parallel and feed a single array of antenna elements. The outputs of the beam formers (104, 106) are combined in summers (98) and are then amplified by power amplifiers 38 and applied to excite the array elements (30). Phase shifters (92-96) are coupled between the beam formers (104, 106) and the array elements (30) to shift the phase of the beam signals and thereby aim or shift the beams in a direction orthogonal to the scanning direction in order to provide the desired coverage over the earth.

16 Claims, 7 Drawing Sheets

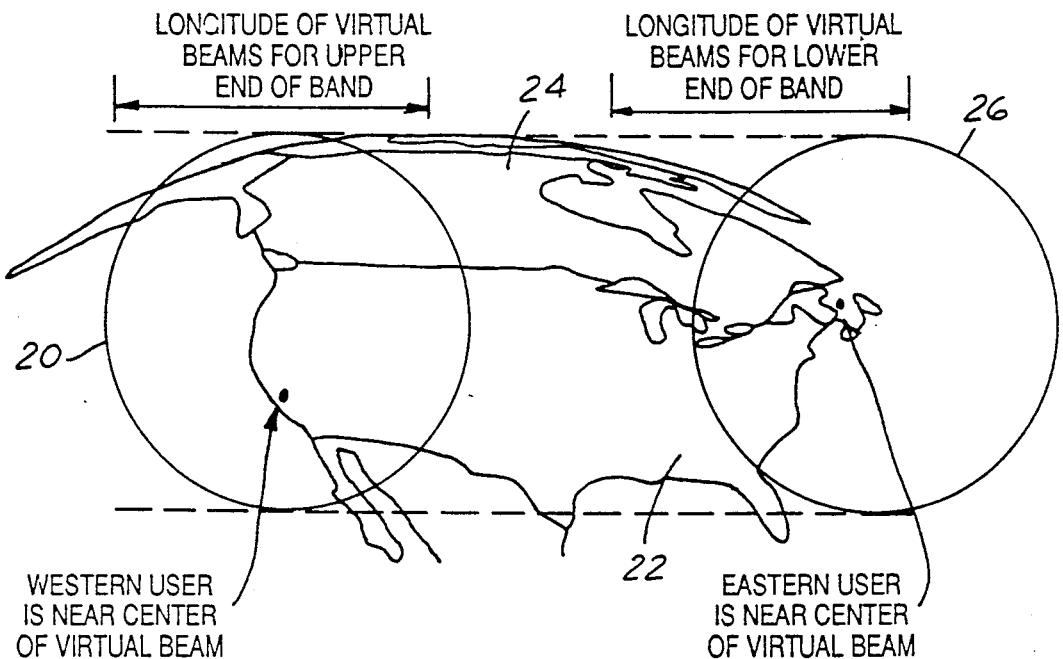
FIG.1
FIG.2
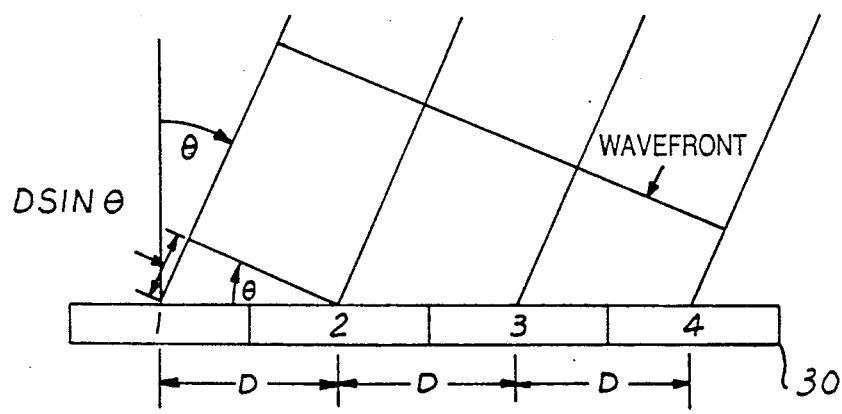
D = SPACING BETWEEN ELEMENTS
Θ = BEAM SCAN ANGLE
λ = WAVE LENGTH OF RADIATION
ΔΨ = PHASE INCREMENT BETWEEN ADJACENT ELEMENTS
f = FREQUENCY RELATIVE TO BAND CENTER
ΔT = TIME DELAY INCREMENT BETWEEN ADJACENT ELEMENTS
$$\frac{2\pi D}{\lambda} \sin\theta = \Delta\Psi = 2\pi f \Delta T$$
$$\therefore \sin\theta = \frac{\lambda}{D} f \Delta T$$

METHOD AND APPARATUS FOR PRODUCING MULTIPLE, FREQUENCY-ADDRESSABLE SCANNING BEAMS

TECHNICAL FIELD

The present invention generally relates to satellite communications systems, and deals more particularly with a method and an apparatus for forming frequency-addressable beams of electromagnetic energy used to transmit and receive communication signals between a satellite and a plurality of communication sites covering an area of the earth.

BACKGROUND ART

Frequency addressable beams of electromagnetic energy have been used in the past to provide beams of communication signals which are optimum for each user location. Such systems are sometimes referred to as a frequency scanning antenna system, wherein the location of each virtual beam that is formed is determined by the frequency of the user, with the user frequencies being spread out over an area in sight of the antenna. The beam may be thought of as being scanned over an area of the earth, as from east to west, for example, as the carrier frequency of the virtual beams thusly formed is increased.

In order to provide sufficient gain at each user site while reusing a given range of frequencies, the use of multiple scanning beams has been proposed to service a given area of the earth, as will be discussed below in more detail. However, in order to produce such multiple beams, it would be necessary to employ multiple antenna arrays and possibly more than one satellite to achieve the necessary coverage over the earth.

There is therefore a need in the art for a method and an apparatus for forming multiple frequency-addressable beams using a single antenna array deployed on a single satellite. The present invention satisfies this need, however, other objects and advantages of the present invention will become apparent from the detailed description thereof provided below.

SUMMARY OF THE INVENTION

According to one aspect of the invention, an apparatus is provided for forming at least first and second frequency-scanned beams of electromagnetic radiation comprising an array of antenna elements, first and second inputs for respectively receiving first and second pluralities of beam signals, first and second delay means for delaying the beam signals as a function of frequency such that the first and second beams each scan over a target area, and means for combining the beam signals from the first and second delay means such that each of the antenna elements receives beam signals in the first and second pluralities thereof. Thus, the beam-forming apparatus produces multiple, frequency-addressable beams which may be independently scanned over the target area. In order to produce vertical aiming or spacing of the separately formed beams, phase-shifting means are provided between the first and second delays means and at least certain of the combining means in order to shift the phase of at least certain of the beam signals, thereby spacing the centers of the beams from each other in a direction orthogonal to that in which the beams are scanned. The antenna elements are preferably arranged in an array of N columns and M rows, and the first and second delays means each includes N delay elements respectively operatively associated with the N columns of antenna elements. The combining means may include a plurality of summers respectively associated with the antenna elements, each of the summers being operable for combining delayed beam signals in the first and second pluralities thereof.

According to another aspect of the invention, a method is provided for forming first and second beams of electromagnetic radiation which are scanned over first and second areas as a function of frequency, which comprises the steps of producing first and second sets of beam signals, introducing time delays in the beam signals as a function of frequency, combining the first and second sets of delayed beam signals, and delivering the delayed beam signals thusly combined to an array of antenna elements. Further, the method includes introducing phase shifts into at least certain of the beam signals delivered to the antenna elements in order to relatively position the first and second beam signals in a direction orthogonal to the direction of scanning thereof.

Thus, a primary object of the present invention is to provide a method and apparatus for forming multiple, frequency-addressable beams of electromagnetic energy for use in communication systems, which employs a single antenna array.

A further object of the invention is to provide a method and apparatus as described above which permits the production of multiple beams without the need for deploying multiple antennas on a single or multiple satellites.

Another object of the present invention is to provide a method and apparatus as described above which provides for a multi-beam antenna which permits utilization of a large aperture and a frequency allocation system that permits reuse of the frequencies.

Another object of the present invention is to provide a method and apparatus as described above that permits scanning of the beams independently in the direction of scanning.

These, and further objects and advantages of the present invention, will be made clear or will become apparent in the following detailed description of the invention.

BRIEF DESCRIPTION OF THE DRAWINGS

In the accompanying drawings:

FIG. 1 is a diagrammtic view of an area of the earth showing a pair of virtual UHF beams formed by a frequency-scanned antenna.

FIG. 2 is a diagram of a planar array antenna employed in the present invention.

DESCRIPTION OF THE PREFERRED EMBODIMENTS

Figure 3:
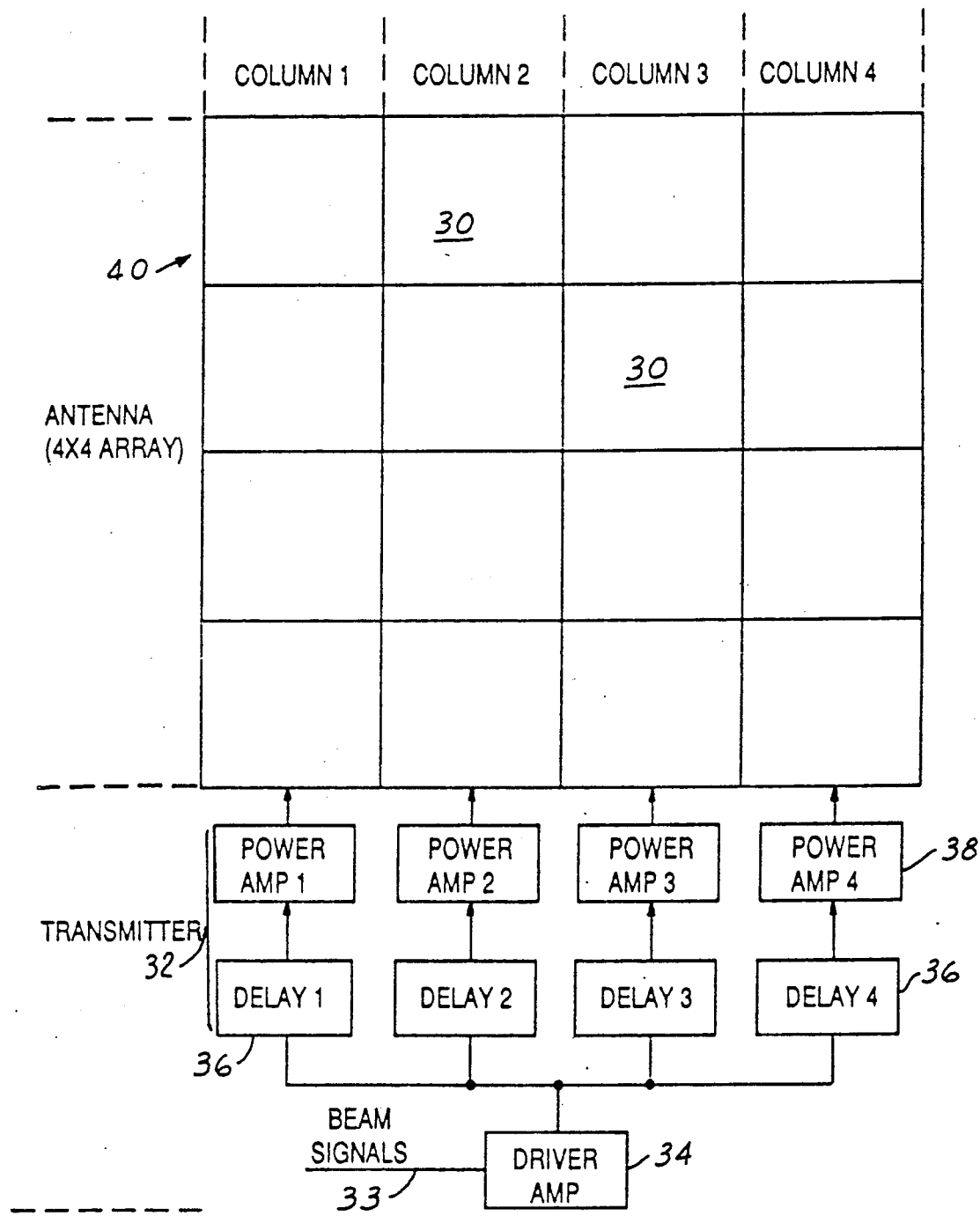
FIG. 3 is a combined block and diagrammatic view of a transmitting planar array employed in the frequency-scanned antenna of FIG. 1.

Before describing the multiple frequency-addressable beam system of the present invention, the concept of a single frequency-addressable or frequency-scanned beam will be discussed, and in this connection reference is first made to FIG. 1. An area on the earth which the includes the United States of America 22 and Canada 24 is desired to be placed in communication with a satellite above the earth by means of a frequency-addressable beam of electromagnetic energy. The frequency-scanned antenna on the satellite (not shown) forms a plurality of virtual beams covering the desired area, two of such beams being designated as 20 and 26 respectively. The virtual beam 20 has at its center the highest density of Western users, while the Eastern beam 26 likewise has at its center a relatively high concentration of Eastern users. The outer circular periphery of the beams 20, 26 is indicated as having a gain which is 3 dB down relative to its center. As mentioned above, the antenna is designed to scan the beam as a function of frequency. At the high end of the frequency band to be allocated for the proposed service, e.g. 870 MHz, the beam is formed on the West Coast, whereas at the low end of the band, e.g. 866 MHz, the beam is formed on the East Coast. Frequencies in between the frequencies associated with the West and East Coast beams 20, 26 are formed at various locations between the two coasts. Using this virtual beam technique, both the East and West Coast users are near the center of a beam and receive nearly the maximum gain of the beam. These users will receive 2 or 3 dB more power than they would from a comparable satellite using fixed, spot-type beams. In the absence of such a frequency-scanned beam, it would be necessary to employ two fixed, spot-type beams that intersect near the middle of the North American region. The positioning of these two fixed beams is such to barely cover the desired regions of the beam edge of the antenna where the gain is 3 dB down from the beam center. Obviously, the Eastern and Western users would be near the edge of one of these beams, and the EIRP that they would receive would be nearly 3 dB below that of the center of the beam.

As will be discussed in detail below, the frequency-scanned virtual beam can be arranged to spread the communication channels non-uniformly across the country in order to accommodate market requirements. This geographic distribution can be accomplished without compromising optimum virtual beam positions.

The frequency-scanned virtual beam technique may be used for both L band service and UHF. The beam patterns need not be circular, but rather can be configured to be fan-shaped, for example, such that the beam is narrower in the east-west direction than in the north-south direction.

The frequency-scanned antenna described above provides for higher antenna gain than normal, thereby improving the communication capability to small terminals. The antenna beam from the satellite is steerable from east to west. When many users are being serviced simultaneously, antenna pointing is optimized for each user, as described above, allowing a 3 dB gain improvement over spot-type beams. The appropriate frequency to each user is assigned on a demand basis.

Referring now to FIG. 2, the frequency scan discussed above is generated in a planar array antenna comprising an array of radiating elements 30, when a progressive time delay is introduced into the array such that the excitation phase difference between adjacent elements 30 is proportional to the frequency. The time delay is most conveniently synthesized by the use of lumped parameter, all-pass networks employing well-known design techniques which may be introduced ahead of the final power amplifiers in order to minimize loss.

FIG. 3 illustrates a 4×4 array of radiating elements 30, which elements 30 are arranged in N columns and M rows. In this example, it is assumed that all four elements in each column thereof are co-phased and that the phase progression for scanning is introduced between columns. By way of example, in the case of a UHF mobile satellite service, the frequency band assigned may be from 866 to 870 MHz for the downlink and 821 MHz for the uplink. Each 4 MHz bandwidth is subdivided into approximately 800 assignable slots for companded single-sideband voice communications. Using the frequency-scanning technique discussed above, these 800 assignable channels are available within 0.10 degrees of the optimum assignment. Thus, the reduction from peak gain is no less than 0.01 dB in contrast to earlier designs using fixed beams where the beam edge loss and gain relative to peak gain was approximately 3.0 dB.

In FIG. 3, the beam signals are produced by a beam-forming network and are delivered to a driver amplifier 34 via an input 33 thereto. The beam signals are amplified by the driver amplifier 34, and the amplified signals are delivered to four delay devices 36 which are respectively operatively associated with the columns of antenna elements 30. The delay devices 36 introduce progressive delays into the signals, and the delayed signals are then amplified by respectively associated amplifiers 38 before delivery thereof to the columns of antenna elements 30. The driver amplifier 34, delay devices 36 and power amplifiers 38 collectively form the transmitter 32.

Figure 4:
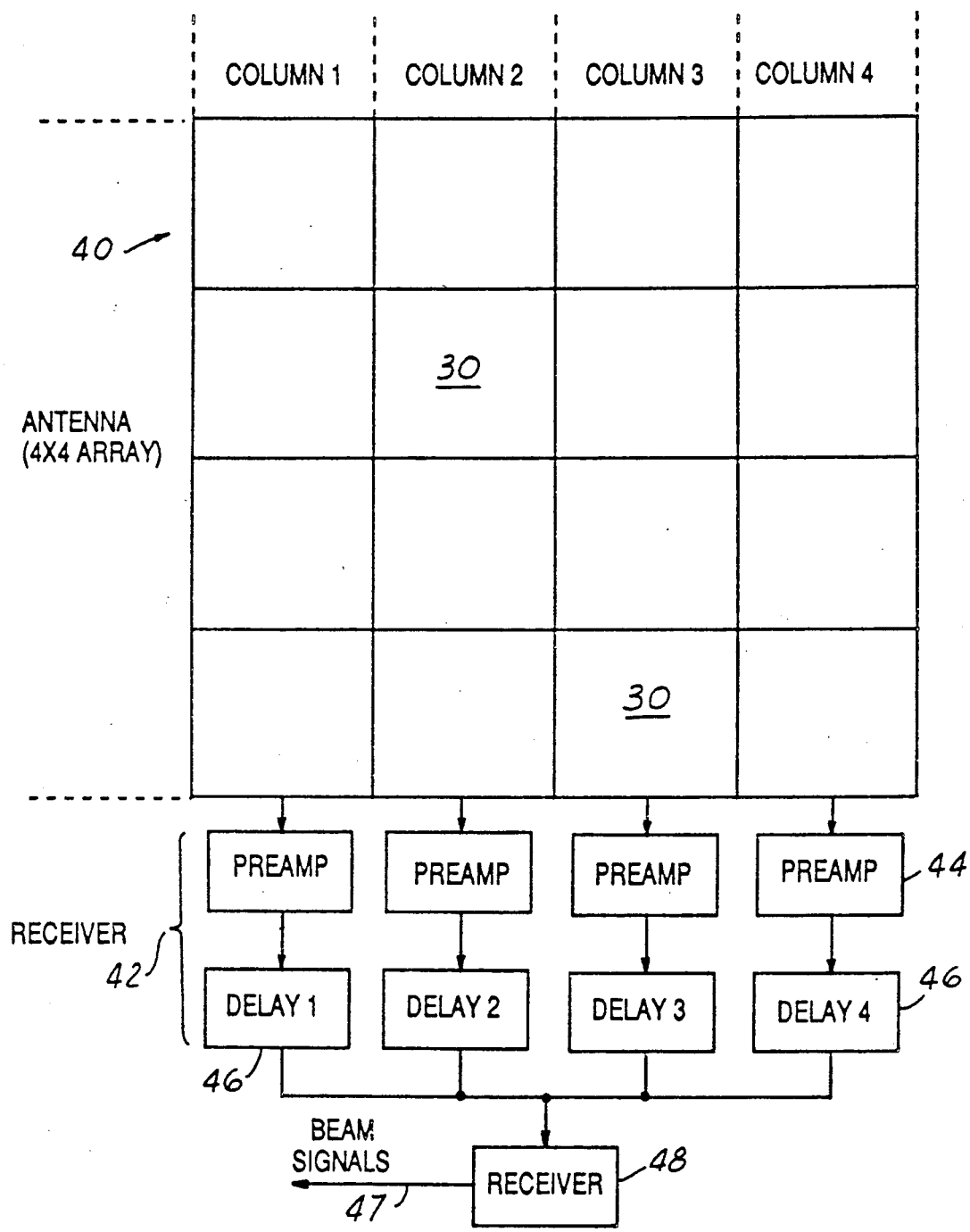
FIG. 4 is a combined block and diagrammatic view of a receive planar array employed for use in the frequency-scanned antenna of FIG. 1.

FIG. 4 depicts a receive planar array suitable for use with a frequency-scanned system as described above. The antenna 40 comprises a 4×4 array of antenna elements 30 which feed a receiver 42. Each column of the antenna elements 30 outputs signals to a preamplifier 44, and the preamplified signals are then delivered to delay circuits 46 which introduce progressive delays into the received signals as previously discussed with respect to FIG. 2. The output of the delay circuits 46 is input to a receiver 48 which outputs beam signals on an output 47. Thus, it may be appreciated that the scanning beam antenna described above is configured to scan both the transmit beam and the receive beam.

Figure 5:
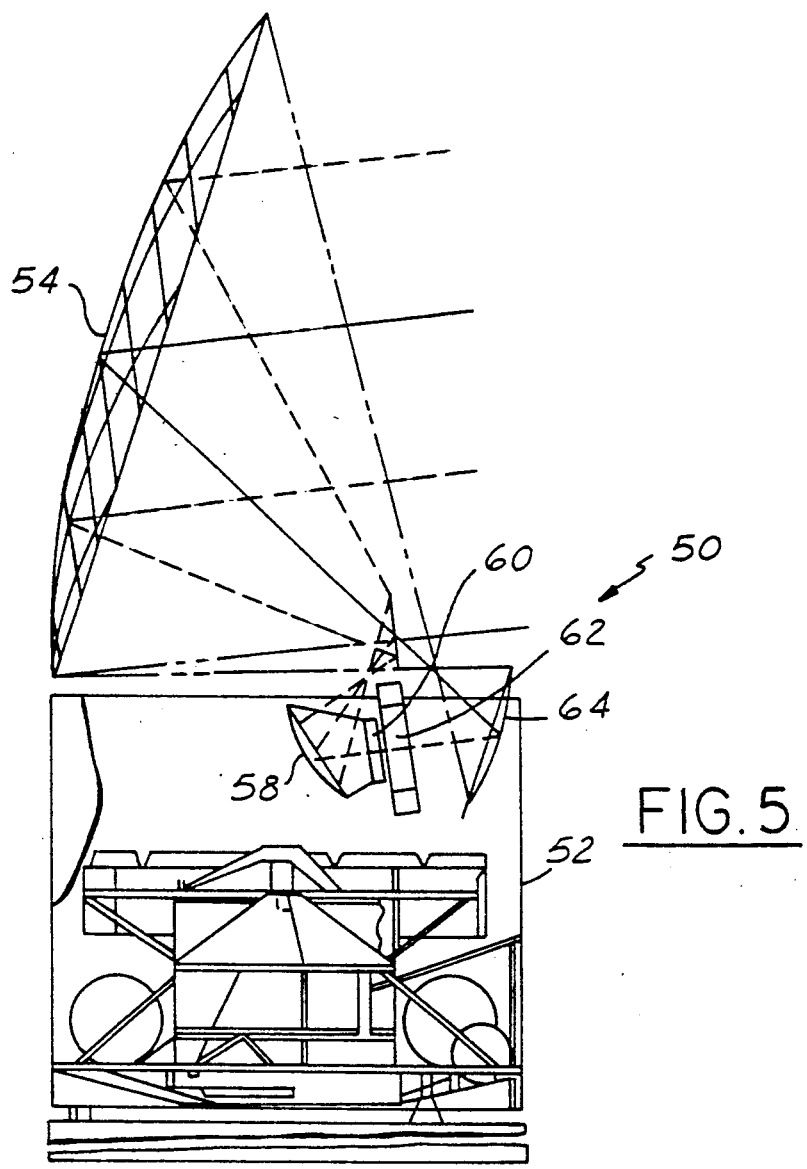
FIG. 5 is an elevational, diagrammatic view of a satellite employing the multiple frequency-addressable beam antenna of the present invention, the antenna being depicted in its deployed position, with parts of the housing of the satellite being broken away for sake of clarity.

Attention is now directed to FIG. 5 which depicts a typical communications satellite 50 in which the method and apparatus of the present invention may be employed. The satellite 50 includes a generally cylindrical outer body 52, one end of which opens in space to deploy the antenna and reflector system. The antenna configuration includes a pair of antenna feeds 60, 62 for providing signals in the L band and UHF, respectively. The feeds 60, 62 may be of the planar array type as discussed above. Since a directly radiating aperture may require an unconventionally large number of individual elements, a pair of confocal parabolas, comprising a small parabolic reflector 58 and a large parabolic reflector 54, is used to magnify the apparent dimensions of the smaller array 60. Such a configuration is well known in operation and effect, and the details thereof therefore need not be described herein. Both the L band and UHF subsystems use the same aperture and frequency scanning technique. The larger antenna feed array 62 illuminates a reflector 64 which images the signals through a frequency-selective screen 56 to the large reflector 54. The frequency-selective screen 56, by virtue of its dichroic properties, reflects the L band signals and thus functions as a reflector, but also passes the UHF signals therethrough. All of the feed networks and confocal reflectors are rigidly mounted to the payload compartments, although the mounting structure necessary to do so is not shown for purposes of clarity in FIG. 5. Only the main reflector 54 and the frequency-selective screen 56 are required to be deployed from a stowed position during spacecraft launch into their operable position in orbit.

Figure 6:
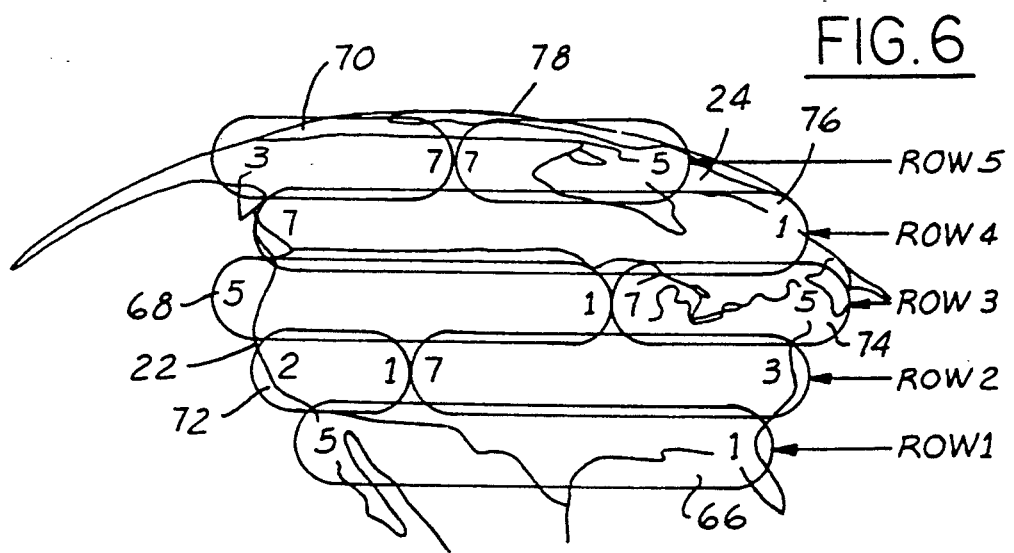
FIG. 6 is a diagrammatic view of an area on the earth and depicting its coverage by eight frequency-scanned beams formed in accordance with the method and apparatus of the present invention.

Referring to FIG. 6, eight frequency-scanned beams 66-80 are produced, wherein each beam includes a number of sub-bands. These eight frequency-scanned beams 66-80 cover the United States of America and Canada. The beams are arranged in terms of frequency so that a given set of frequencies is reused without overlap of beams of the same, or close to the same, frequency which would otherwise give rise to interference. For example, the beam 66 employs the lowest frequency sub-band (1) for Florida and the highest sub-band (7) in Southern California. The middle frequencies, i.e. bands (3) and (4) are employed to cover Texas. Similarly, beams 70 and 72 residing in row 2 of the scanning using sub-band (3) for the Eastern U.S. coast and sub-band (7) over Oklahoma. Sub-bands (1) and (2) are used over New Mexico and California. The use of this scanning beam frequency arrangement minimizes spacecraft complexity. Each of the eight frequency-scanned beams 66-80 requires a separate transponder; however, only eight feed network layers are required. To some extent, the frequencies can be bunched geographically in each beam to meet market demand. In Texas, for example, channels from frequency group 2 could be used if the corresponding frequencies in rows 3 and 5 were moved westward by a corresponding amount. Each beam is an independent demand access system. However, with the frequency scan system, there are only eight independent systems.

Figure 7:
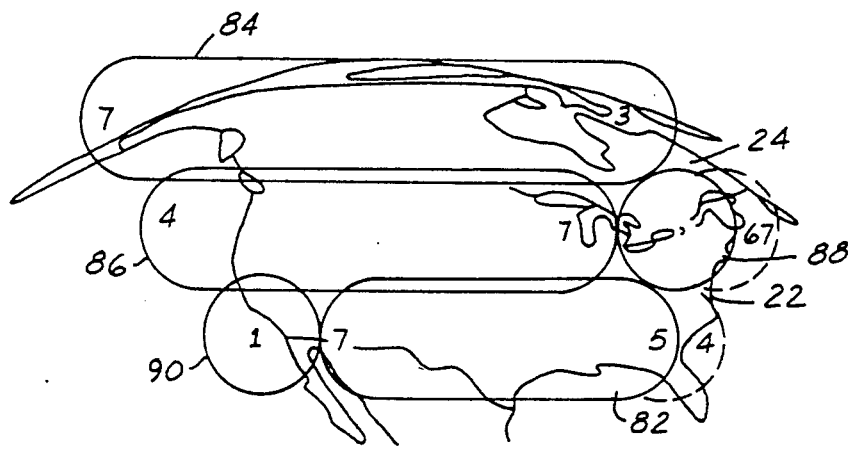
FIG. 7 is a view similar to FIG. 6 but depicting five scanned UHF beams.

The UHF system can also be arranged with scanning beams to allow the frequency to be reused one time, as shown in FIG. 7. Only five beams 82-90 arranged in three rows are necessary to cover the U.S.A. and Canada. Beams 82 and 88 can be stretched if necessary to cover more remote eastern sectors of Florida and Canada.

Figure 8:
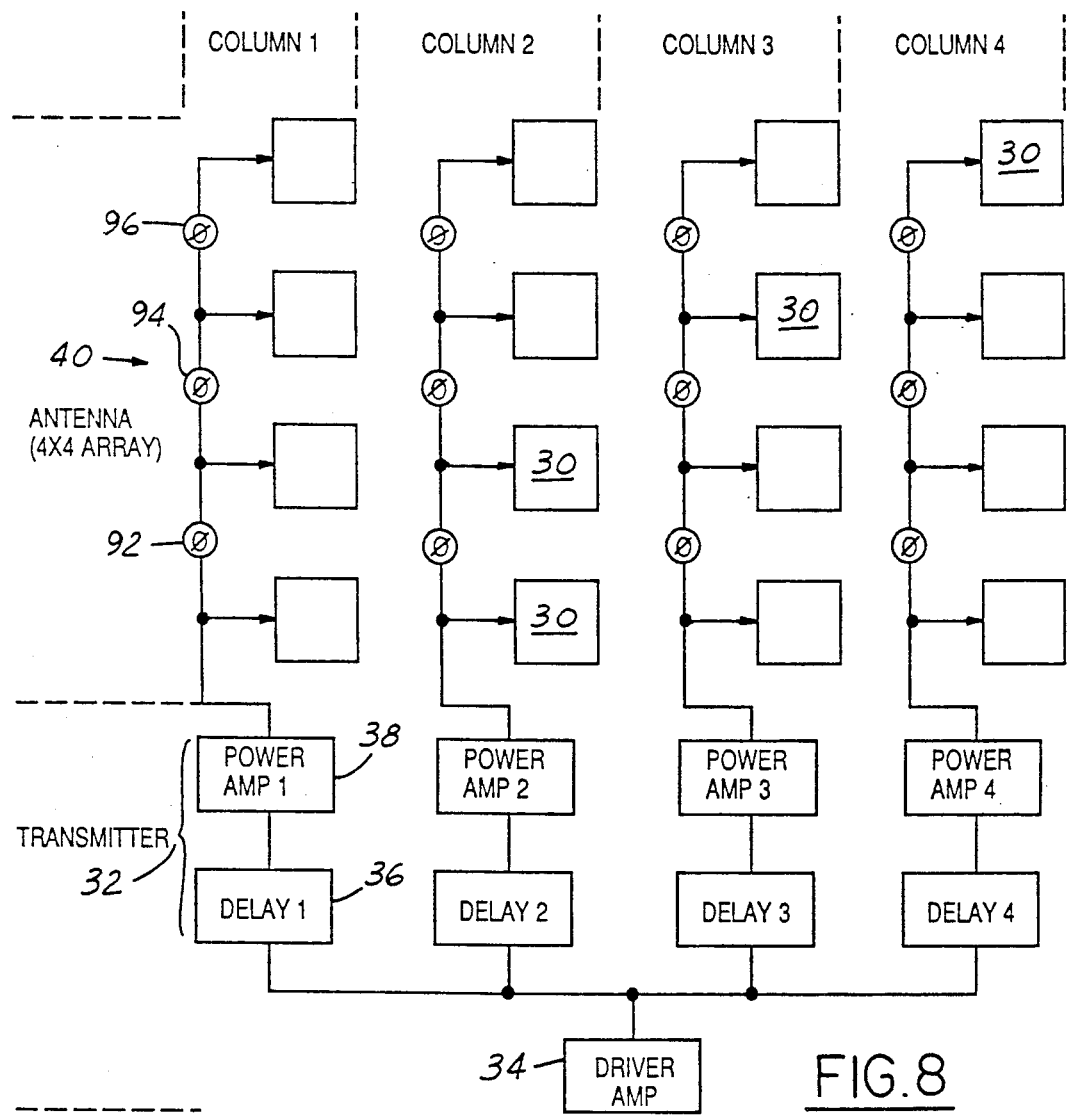
FIG. 8 is a combined block and diagrammatic view of a transmitting power array employing vertical steering forming part of the present invention.

Attention is now directed to FIG. 8 which depicts a transmitting planar array for producing the vertical steering required to vertically aim the scanning beams to achieve the coverage and horizontal scanning depicted, and previously discussed, in FIGS. 6 and 7.

Phase shifters 92, 94, 96 are respectively inserted between the transmitter 32 and successive ones of the antenna elements 30 in each of the columns so that certain of the beam signals are passed through phase shifters before being fed to the array elements 30. The phase shifters 30 are of course conventional devices and result in the input to each of the array elements being shifted by an amount required to provide a fixed scan in the vertical direction, i.e. orthogonal to the scanning path. The phase shifters 92, 96 provide a constant phase shift over the frequency band so that the beam is fixed in the vertical position but scans in frequency in the horizontal direction.

Figure 9A:
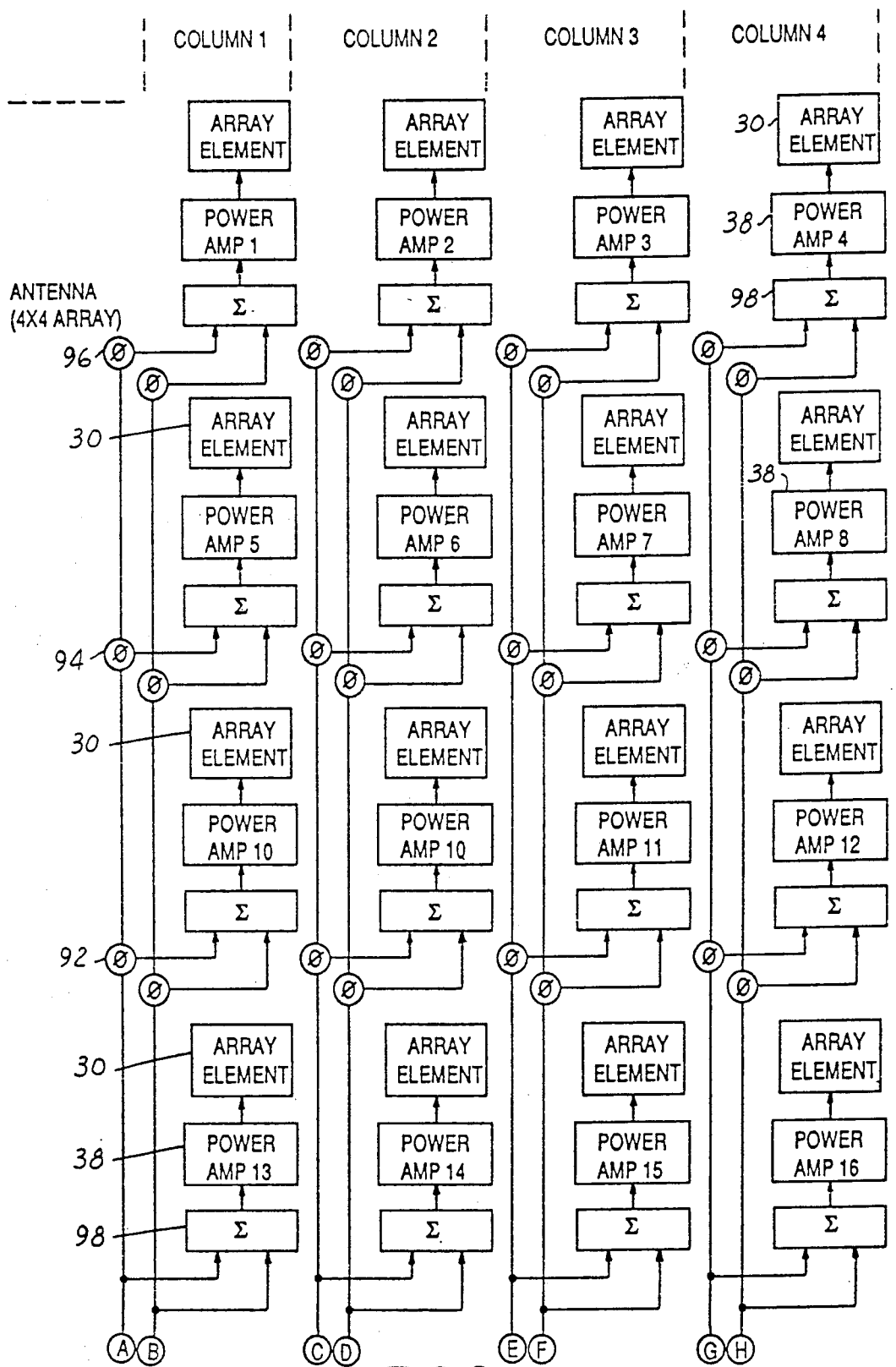
FIGS. 9A and 9B, taken together, form a combined block and diagrammatic view of an antenna array and a pair of frequency-scanning beam formers for forming a pair of the beams shown in FIG. 6.
Figure 9B:
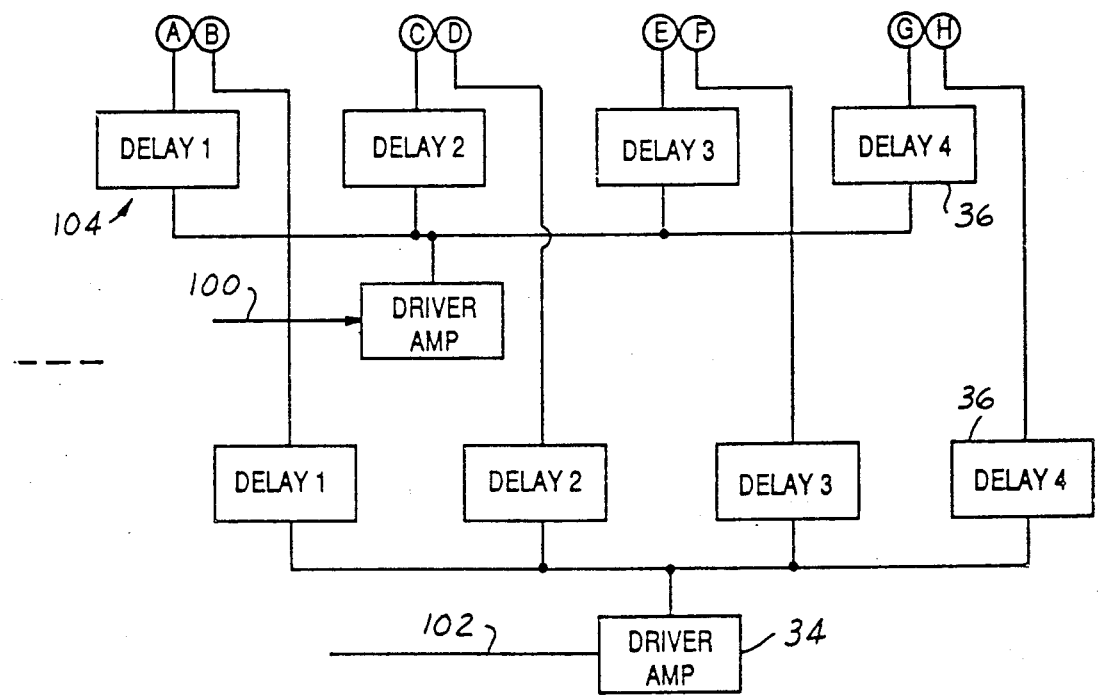

FIG. 9 depicts the transmitter and beam-forming network for forming two simultaneous frequency-scanned beams. It will be understood that the configuration depicted in FIG. 9 is likewise suitable for use as the receiver in much the same way that the transmitting and receive arrays were described with reference to FIGS. 3 and 4, respectively. Also, it is to be understood that although the network depicted in FIG. 9 is suitable for forming only two simultaneous frequency-scanned beams, the inventive concept disclosed herein is equally applicable to networks for forming greater than two of such beams. Antenna beam signals are respectively input to the beam formers 104, 106 via corresponding inputs 100, 102. These input beam signals are respectively delivered to driver amplifiers 84 of the two beam formers 104, 106, and the resulting, amplified signals are delivered to a bank of delay elements 36 in each beam former 104, 106. The delay elements of each beam former 104, 106 are respectively, operatively associated with the array elements 30 in each column of the array. The outputs of the delay elements 36 of both beam formers 104, 106, for any given column of the array elements 30, are delivered to a summer 98 which combines the delayed signals from the two beam formers. The combined signals are delivered to a power amplifier 38 and thence to the array element 30. As in the case of the embodiment of FIG. 8, phase shifters 92, 94, 96 are employed between the delay elements and the summers 98 in certain rows thereof in order to provide the desired vertical aiming of the beam.

It may thus be appreciated that each array element 30 has a separate transmitter associated with it to minimizes losses at higher power levels. The phase shifters 92, 94, 96 provide a fixed vertical pointing for each of the two scanning beams thusly produced. For example, with reference to FIG. 6, the beam former 104 might be employed to produce the scanning beam 66 in row 1, while the beam former 106 might be employed to produce the scanning beam 68 in row 3.

From the foregoing, it may be appreciated that the method and apparatus described above not only provides for the reliable accomplishment of the objects of the invention, but does so in a relatively simple and economical manner. It is recognized, of course, that those skilled in the art may make various modifications or additions to the preferred embodiment chosen to illustrate the invention without departing from the spirit and scope of the present contribution to the art. Accordingly, it is to be understood that the protection sought and to be afforded hereby should be deemed to extend to the subject matter claimed and equivalents fairly within the scope of the invention.

What is claimed is:

I claim:

1. Apparatus for forming first and second frequency scanned beams of electromagnetic radiation, comprising:
   an array of antenna elements;
   first and second inputs respectively receiving first and second pluralities of beam signals;
   first and second delay means respectively coupled with said first and second inputs, for delaying the beam signals as a function of frequency such that said first and second beams each scan over a target area; and
   means coupled between said antenna elements and said first and second delay means, for combining the beam signals from said first and second delay means, such that each of said antenna elements receives beam signals in said first and second pluralities thereof.

2. The apparatus of claim 1, including phase-shifting means coupled between said first and second delay means, and at least certain of said combining means for shifting the phase of at least certain of said beam signals in order to space the centers of the first and second beams from each other in a direction orthogonal to the direction in which said beams are scanned.

3. The apparatus of claim 2, wherein said phase-shifting means includes first and second sets of phase-shifting elements respectively coupled with said first and second delay means.

4. The apparatus of claim 1, wherein:
   said antenna elements are arranged in an array of N columns and M rows, and
   said first and second delay means each includes N delay elements respectively operatively associated with said N columns of antenna elements.

5. The apparatus of claim 4, wherein said combining means includes a plurality of summers respectively associated with said antenna elements, each of said summers including a pair of inputs respectively coupled with delay elements in said first and second delay means, each of said summers being operable for combining delayed beam signals in said first and second pluralities thereof.

6. Apparatus for forming first and second pluralities of antenna beams respectively lying along first and second essentially parallel axes, wherein the positions of the beams in each plurality thereof is a function of frequency of the beam signals, comprising:
   an orthogonal array of antenna elements arranged in N rows and M columns;
   first means for receiving a first set of beam signals respectively associated with said first plurality of antenna beams;
   second means for receiving a second set of beam signals respectively associated with said second plurality of antenna beams;
   first delay means coupled with said first receiving means for progressively delaying the beam signals in said first set thereof which are delivered to the columns of antenna elements such that the excitation phase difference between adjacent elements in each of said rows is a function of frequency;
   second delay means coupled with said second receiving means for progressively delaying the beam signals in said second set thereof which are delivered to the columns of antenna elements such that the excitation phase difference between adjacent elements in each of said rows is a function of frequency; and
   means coupled between said antenna elements and said first and second delay means for combining the progressively delayed beam signals such that each of said antenna elements is excited by progressively delayed beam signals in said first and second sets thereof.

7. The apparatus of claim 6, wherein each of said first and second delay means includes a plurality of delay elements respectively associated with said N columns of antenna elements.

8. The apparatus of claim 7, wherein each of said delay elements has an input for receiving beam signals and an output for delivering delayed beam signals.

9. The apparatus of claim 8, wherein said combining means includes a plurality of summers respectively associated with said antenna elements, each of said summers having a pair of inputs for receiving delayed beam signals respectively in said first and second sets thereof and having an output coupled with an associated one of said antenna elements.

10. The apparatus of claim 6, including first and second phase-shifting means for respectively shifting the phases of the beam signals in a manner to aim the first and second pluralities of beams.

11. The apparatus of claim 10, wherein said first and second phase-shifting means are respectively coupled between said first and second delay means and said combining means.

12. The apparatus of claim 11, wherein said first and second phase-shifting means include first and second pluralities of phase shifters for respectively shifting the beam signals delivered to said antenna elements in a manner such that said first and second axes are spaced apart.

13. The apparatus of claim 8, including a plurality of phase shifters coupled between said summers and said delay elements and operable for aiming said first and second pluralities of beams such that said first and second axes are spaced apart from each other.

14. A method of forming first and second beams of electromagnetic radiation which are scanned over first and second areas as a function of frequency, comprising the steps of:
   (A) producing first and second sets of beam signals;
   (B) introducing time delays in said beam signals as a function of frequency to produce first and second sets of time delayed signals, said first and second sets being respectively related to said first and second areas;
   (C) combining said first and second sets of delayed beam signals;
   (D) delivering the delayed beam signals combined in step (C) to an array of antenna elements.

15. The method of claim 14, wherein step (D) is performed by delivering sets of the delayed signals combined in step (C) respectively to each of the antenna elements in a plurality of columns of said antenna elements.

16. The method of claim 14, wherein step (D) includes the step of introducing phase shifts into at least certain of beam signals delivered to antenna elements arranged in a column thereof and forming a part of an N×M array of antenna elements in order to relatively position said first and second beams in a direction orthogonal to the direction of scanning.

* * * * *